(12) United States Patent
Drost et al.

(10) Patent No.: US 8,994,723 B2
(45) Date of Patent: Mar. 31, 2015

(54) RECOGNITION AND POSE DETERMINATION OF 3D OBJECTS IN MULTIMODAL SCENES

(71) Applicant: MVTec Software GmbH, München (DE)

(72) Inventors: Bertram Drost, München (DE); Markus Ulrich, München (DE)

(73) Assignee: MVTec Software GmbH, Munich (DE)

( * ) Notice: Subject to any disclaimer, the term of this patent is extended or adjusted under 35 U.S.C. 154(b) by 335 days.

(21) Appl. No.: 13/693,666

(22) Filed: Dec. 4, 2012

(65) Prior Publication Data

US 2014/0105506 A1   Apr. 17, 2014

(30) Foreign Application Priority Data

Oct. 12, 2012   (EP) .................................... 12188290

(51) Int. Cl.
*G06K 9/00* (2006.01)
*G06K 9/62* (2006.01)

(52) U.S. Cl.
CPC ........ *G06K 9/00201* (2013.01); *G06K 9/00214* (2013.01); *G06K 9/6211* (2013.01)
USPC ....................................................... 345/419

(58) Field of Classification Search
CPC .......................................... G06T 7/004–7/0045
See application file for complete search history.

(56) References Cited

U.S. PATENT DOCUMENTS

2005/0286767 A1*  12/2005  Hager et al. ................... 382/190
2011/0273442 A1*  11/2011  Drost et al. .................... 345/419

FOREIGN PATENT DOCUMENTS

EP          2 385 483          11/2011

OTHER PUBLICATIONS

Kevin Lai et al; "A Large-Scale Hierarchical Multi-View RGB-D Object Dataset"; 2011 IEEE International Conference on Robotics and Automation (ICRA), IEEE, May 9, 2011; pp. 1817-1824.
Peter Henry et al; "RGB-D Mapping: Using Depth Cameras for Dense 3D Modeling of Indoor Environments"; 12th International Symposium on Experimental Robotics; Dec. 18, 2010.
Anders Glent Buch et al; "Pose Estimation using Local Structure-Specific Shape and Appearance Context"; Feb. 25, 2013.

(Continued)

*Primary Examiner* — Kee M Tung
*Assistant Examiner* — Ryan D McCulley
(74) *Attorney, Agent, or Firm* — Lowe Hauptman & Ham, LLP (57) ABSTRACT

The invention provides a method for recognizing instances of a 3D object in 3D scene data and scene intensity data and for determining the 3D poses of said instances comprising the following steps: (a) providing 3D object data and obtaining object intensity data; (b) providing 3D scene data and scene intensity data; (c) extracting scene feature points from the intensity data; (d) selecting at least one reference point from the 3D scene data; (e) computing, for each selected reference point, pose candidates for the 3D object under the assumption that said reference point is part of the 3D object by maximizing the number of extracted scene feature points that are consistent with the 3D object under the given pose candidate; (f) computing a set of filtered poses from the pose candidates.

23 Claims, 3 Drawing Sheets

(56) References Cited

OTHER PUBLICATIONS

Hyoseok Hwang et al; "Robust Descriptors for 3D Point Clouds using Geometric and Photometric Local Feature"; 2012 IEEE/RSJ International Conference on Intelligent Robots and Systems, Oct. 7-12, 2012; pp. 4027-4033.

Bertram Drost et al; "3D Object Detection and Localization Using Multimodal Point Pair Features"; 3D Imaging, Modeling, Processing, Visualization and Transmission, 2012 Second Joint 3DIM/3DPVT Conference; Oct. 13, 2012; pp. 9-16.

Federico Tombari et al; "A Combined Texture-Shape Descriptor for Enhanced 3D Feature Matching"; 2011 18th IEEE International Conference on Image Processing; CVLab-DEIS; University of Bologna, Italy; pp. 809-812.

Wonwoo Lee et al; "Depth-assisted Real-time 3D Object Detection for Augmented Reality"; The 21th International Conference on Artificial Reality and Telexistence; May 16, 2011; pp. 126-132.

Luis A. Alexandre; "3D Descriptors for Object and Category Recognition: a Comparative Evaluation"; Oct. 7, 2012.

Min Sun et al; "Depth-Encoded Hough Voting for Joint Object Detection and Shape Recovery"; ECCV 2010, Part V, LNCS 6315; Sep. 5, 2010; pp. 658-671.

Liefeng Bo et al; "Depth Kernel Descriptors for Object Recognition"; 2011 IEEE/RSJ International Conference on Intelligent Robots and Systems; Sep. 25-30, 2011, San Francisco, CA, USA; pp. 821-826.

Extended European Search Report mailed Mar. 27, 2013 for Application No. EP 12 18 8290.

\* cited by examiner

RECOGNITION AND POSE DETERMINATION OF 3D OBJECTS IN MULTIMODAL SCENES

CROSS REFERENCE TO RELATED APPLICATION

This application claims the priority of European Patent Application No. 12 18 8290.6, filed on Oct. 12, 2012 in the EPO (European Patent Office), the disclosure of which is incorporated herein in their entirety by reference.

FIELD OF THE INVENTION

This invention relates generally to machine vision systems, and more particularly, to the recognition and localization of 3D objects in scenes observed by both imaging and 3D sensors.

BACKGROUND OF THE INVENTION

Object recognition and localization is part of many machine vision applications. Knowing the precise location of the object of interest in the scene is crucial for any subsequent manipulation and inspection tasks. Many different techniques were developed to find objects in intensity images or 3D scans of a scene, a task commonly referred to as matching. This document describes a matching approach that uses simultaneously both intensity images and 3D scans of a scene to find an object by optimizing the consistency between model and scene in both the 3D data and the intensity data.

Descriptor- or feature-based techniques are based on finding correspondences between points in the scene and points on the model by using descriptors. Such descriptors express the 3D surface or the intensities around a given scene point using a low-dimensional representation. Such descriptors are typically computed off-line for all or a selected set of points of the model and stored in a database. For recognizing the object in a scene, the descriptors are calculated for points in the scene and corresponding model points are searched using the pre-computed database. Once enough correspondences were found, the pose of the object can be recovered. Extensive overviews of different 3D surface descriptors are given in Campbell and Flynn (A Survey Of Free-Form Object Representation and Recognition Techniques, 2001, Computer Vision and Image Understanding, Vol. 81, Issue 2, pp. 166-210), Mamic and Bennamoun (Representation and recognition of 3D free-form objects, 2002, Digital Signal Processing, Vol. 12, Issue 1, pp. 47-76) and Mian et al. (Automatic Correspondence for 3D Modeling: An Extensive Review, 2005, International Journal of Shape Modeling, Vol. 11, Issue 2, p. 253). Commonly used feature descriptors in intensity data include edges, as described in Canny (A Computational Approach To Edge Detection, IEEE Transactions on Pattern Analysis and Machine Intelligence, 8(6):679-698, 1986), the SIFT keypoint descriptor by Lowe (Object recognition from local scale-invariant features, Proceedings of the International Conference on Computer Vision. 2. pp. 1150-1157; see also U.S. Pat. No. 6,711,293), and the SURF keypoint descriptor by Bay et al. (SURF: Speeded Up Robust Features, Computer Vision and Image Understanding (CVIU), 2008, Vol. 110, No. 3, pp. 346-359; see also U.S. Pat. No. 8,165, 401). Many other feature point descriptors were proposed in the literature. Methods that rely on feature descriptors often do not work it the object of interest has little distinctive shape or intensity information, because descriptors are then less discriminative.

Several approaches use so-called geometric primitives to detect an object in a scene. A geometric primitive is a simple geometric object, such as a plane, a cylinder or a sphere. Compared to free-form objects, geometric primitives are easier detectable in a scene due to their intrinsic symmetries. Several methods exist that detect primitives or objects composed of geometric primitives in scenes. In EP-A-2 047 403, the 3D object is partitioned into geometric primitives. Such geometric primitives are then searched for in the 3D scene, and the object is recognized by identifying primitives in the scene that are similar to primitives in the object. Other methods use a variant of the generalized Hough transform to detect geometric primitives in the scene, for example Katsoulas (Robust extraction of vertices in range images by constraining the hough transform, 2003, Lecture Notes in Computer Science, Vol. 2652, pp. 360-369), Rabbani and Heuvel (Efficient hough transform for automatic detection of cylinders in point clouds, 2005, Proceedings of the 11th Annual Conference of the Advanced School for Computing and Imaging (ASCI'05), pp. 60-65), and Zaharia and Preteux (Hough transform-based 3D mesh retrieval, 2001, Proceedings of the SPIE Conf. 4476 on Vision Geometry X, pp. 175-185). All methods that rely on geometric primitives have the disadvantage that they do not work with general free-form objects.

Several methods for recognizing 3D objects in range images were developed, for example in EP-A-1 986 153. Such methods work on single range images, as returned by a variety of sensor systems. However, all range image based systems are limited to the 3D information acquired from a single range image and cannot cope with general 3D information from other 3D sensors or from the combination of different range images. Additionally they are not fast enough for real-time systems, as they typically require a brute-force search in the parameter space.

Several methods for refining a known 3D pose of an object are known. Such methods require as input an approximate 3D pose of the object in the scene, and increase the accuracy of that pose. Several such methods were developed that optimize the pose using 3D data only, such as Iterative Closest Points (see for example Zhang (Iterative point matching for registration of free-form curves, 1994, International Journal of Computer Vision, Vol. 7, Issue 3, pp. 119-152), EP-A-2 026 279 and Fitzgibbon (Robust registration of 2D and 3D point sets, 2003, Image and Vision Computing, Vol. 21, Issue 13-14, pp. 1145-1153)). Other methods for refining the pose of an object use only intensity data, such as Wiedemann et al. (Recognition and Tracking of 3D Objects, IEEE International Conference on Robotics and Automation 2009, 1191-1198). The major disadvantage of pose refinement is that the input pose needs to be close enough to the correct pose or otherwise the methods will fail to converge. Good approximates of the correct pose are, however, difficult to obtain for 3D scenes that in practical applications often contain clutter, occlusion, noise, and multiple object instances.

For the foregoing reasons, there is a need for a method that allows efficient recognition of arbitrary free-form 3D objects and recovery of their 3D pose in scenes which were captured with one or more intensity images and and ore more 3D sensors. For the purpose of this document, scenes captured with intensity images and 3D sensors will also be called multimodal scenes.

SUMMARY OF THE INVENTION

The present invention provides a system and method for finding a rigid 3D object in a multimodal scene and for determining the 3D pose of the object in scene coordinates. In a typical application the multimodal scene is acquired using, for example, stereo with two or more cameras, time-of-flight, depth from focus, photometric stereo, or structure light. The 3D pose of the object is then found using the presented method. The resulting 3D pose is used, for example, for manipulating the object with a robot, detecting errors on the object's surface, or computing surface characteristics of the object.

The presented method has several advantages over previous methods: It allows the recognition of free-form objects with any kind of surface geometry and is thus not limited to objects of a certain type or shape. Additionally, the method is robust to noise, missing object parts, clutter, and small deformations. The pose of the 3D object is determined with high accuracy. The finding of the 3D object and the recovery of its 3D pose requires little computation time and is suitable to real-time environments.

The method comprises two phases. In the offline-phase, a model description is computed that can later be used for finding the object. The user needs to provide a 3D representation of the object to be found, e.g. a 3D CAD model or a set of 3D points, and optionally images of the object from various viewpoints. If the images are not provided, they are artificially rendered from the 3D representation of the object. The method thus requires only the geometric shape of the object. No color, texture or surface reflectance information is required, making the invention suitable for a large range of object types. However, additional local information, such as color and texture, may be provided to use other intensity features and thus further increase the robustness of the method. The model description is built by sampling the object's surface at a certain rate, computing feature points and feature point descriptors from the intensity images of the object from different viewpoints, optionally filtering the feature points using the 3D representation, pairing each sampled 3D point with each feature point, computing a descriptor that describes each such pair, and storing the point pairs in a database that is indexed by said point pair descriptor.

In the online phase, the user provides a multimodal scene, comprised of a set of intensity images and a set of 3D scenes, and the model description computed in the offline-phase. The images and scenes must be calibrated with respect to each other, i.e., the intrinsic sensor parameters and their relative position must be known beforehand. For each intensity image, feature points are extracted and feature point descriptors are computed and optionally filtered using the provided 3D data. Typically, edges are used as feature points and the direction of the edge as feature descriptor. The 3D data is used to remove texture edges and thus obtain only the geometric edges. The 3D scenes are then sampled at a certain rate and a subset of those points is used as reference points. For each reference point, the 3D pose of the object is parameterized relative to that reference point. The sampled 3D points are paired with the extracted feature points, and a descriptor is computed for each such pair. The database computed in the offline phase is used to find point pairs from the model which are similar to pairs in the scene. The matches are grouped and the 3D pose with the most matches is used. This simultaneously optimizes the 3D surface overlap and the consistency of intensity features. As an optional post-processing step, the recovered poses can be further refined.

According to a first aspect the invention provides a method for recognizing instances of a 3D object in 3D scene data and scene intensity data and for determining the 3D poses of said instances comprising the following steps: (a) providing 3D object data and obtaining object intensity data; (b) providing 3D scene data and scene intensity data; (c) extracting scene feature points from the intensity data; (d) selecting at least one reference point from the 3D scene data; (e) computing, for each selected reference point, pose candidates for the 3D object under the assumption that said reference point is part of the 3D object by maximizing the number of extracted scene feature points that are consistent with the 3D object under the given pose candidate; (f) computing a set of filtered poses from the pose candidates. The 3D object data in step (a) and the 3D scene data in step (b) is preferably provided as a set of 3D points or as a 3D Computer Aided Design model. The intensity data in steps (a) and (b) are preferably provided as grayscale or color images. Alternatively, the can be created by artificially rendering the 3D scene data or 3D object data.

Preferably, a 3D model is computed from the 3D object after step (a), comprising the following steps: (a1) selecting at least one sample point from the 3D object data; (a2) extracting object feature points from the object intensity data; (a3) computing point pair descriptors that describe, for each pair of selected sample point and extracted object feature point, the two points and their relation; (a4) creating a model that stores the point pairs indexed by the point pair descriptor. Preferably, step (a4) comprises (a4a) sampling the point pair descriptors; (a4b) creating a global model description that maps each sampled point pair descriptor to a list of point pairs, where each list contains all pairs of selected sample point and extracted object feature point with similar sampled point pair descriptor. The sample points in step (a1) are preferably selected either randomly from the 3D data, or by uniformly sampling the 3D data. The object feature points extracted in step (a2) are preferably the edge points computed with an edge detector, and are preferably filtered using the 3D object data to obtain only the silhouette edges of the object. The global model created in step (a4b) preferably uses a hash table, indexed by sampled versions of the point pair descriptors.

Preferably, the 3D object data, the 3D scene data, and object intensity data and the scene intensity data are filtered before processing comprising at least one of the steps of detecting and removing outliers; reducing noise; and, for the 3D data, computing the surface normals.

The point pair descriptor preferably describes the a feature vector which describes the distance of the sample point and the extracted object feature point within the image plane of the intensity data, scaled by the distance of the object feature point, as well as the relative orientations of the edge, the surface point normal and the difference vector between the two points. In accordance with a further preferred embodiment, it additionally contains a selection of the following features: a feature point descriptor computed for the feature point; the color or gray value at each point; the texture information at each point; surface descriptors at each point; the curvature at each point; other geometric surface information at each point.

In accordance with a further preferred embodiment, in step (d) the reference points are selected randomly from the 3D scene data or by uniformly sampling the 3D scene data. The sampling distance for the uniform sampling of the 3D scene data is preferably computed relative to the size of the 3D object.

It is further preferred that in step (e) a score value is calculated for each pose candidate. Preferably, the pose candidates are computed using a voting scheme. The voting scheme preferably comprises the following steps: (e1) sampling the space of possible object poses; (e2) creating a counter for each pose space sample; (e3) selecting at least one scene feature point from the extracted scene feature points; (e4) computing, for each selected scene feature point, the matching poses such that the reference point is on the surface of the 3D object and the scene feature point is consistent with the 3D object; (e5) increasing, for each matching pose computed in step (e4), the counter for the corresponding pose space sample; and (e6) detecting peak counter values in the sampled pose space and selecting the corresponding pose space samples as pose candidates. In step (e6) the detection of peak counter values is preferably limited to counter values that exceed a threshold. In step (e1), the space of possible object poses is preferably represented by two parameters, where the first parameter is a point on the 3D object, and the second parameter is the angle that describes the rotation around the surface normal. The point on the 3D object is preferably represented as index into a set of points selected from the 3D object data, and rotation angle is sampled by dividing the set of angles into intervals of equal size. The set of points is preferably selected from the 3D object data by uniformly or by randomly sampling the surface of the 3D object.

It is furthermore preferred that in step (a) object feature points are extracted from the object intensity data. The feature points are preferably edge points, which are preferably filtered using the 3D object data to obtain only edge points on depth discontinuities or the object's silhouette.

It is furthermore preferred that in step (e4) the poses are computed using a data structure that allows to search for pairs of 3D object points and object feature points that are similar to the pair of the reference point and the selected scene feature point. The search for point pairs preferably comprises the steps of (e4a) computing a point pair descriptor that describes the reference point, the selected scene feature point and their relation and (e4b) using said point pair descriptor as index to the data structure.

The point pair descriptor preferably describes the a feature vector which describes the distance of the sample point and the extracted object feature point within the image plane of the intensity data, scaled by the distance of the object feature point, as well as the relative orientations of the edge, the surface point normal and the difference vector between the two points. In accordance with a further preferred embodiment, it additionally contains a selection of the following features:a feature point descriptor computed for the feature point; the color or gray value at each point; the texture information at each point; surface descriptors at each point; the curvature at each point; other geometric surface information at each point.

According to a preferred embodiment, step (c4b) comprises (c4c) sampling the point pair descriptor; (c4d) using a data structure that maps the sampled point pair descriptor to a list of point pairs. In step (c4d) a hash table is preferably used as data structure.

According to a preferred embodiment, step (f) the computation comprises (f1) defining a neighbor relation between the pose candidates; (f2) computing the score of each pose as the weighted sum of the scores of the neighboring pose candidates; (B) selecting the set of filtered poses by ranking the poses by the score computed in (f2). Preferably, the neighborhood relation is defined by thresholding the difference in the translation of the poses and the rotation of the poses or by thresholding the maximum distance that a point on the 3D object can have under both poses. The method may further comprise a step where the poses selected in (f3) are recomputed as the average pose over the neighboring poses. The weighting preferably depends on the candidate pose and the current neighboring pose.

The method of the invention preferably further comprises a step that refines each pose of the set of filtered poses by optimizing an error function that is based on one or both of the following: the distances between the 3D scene and the 3D object under said pose; the consistency of the scene intensity data and the model intensity data under said pose.

The method of the invention preferably further comprises a step computing a score for each pose of the set of filtered poses, where the score describes the consistency between the 3D scene and the 3D object under said pose.

The method of the invention preferably further comprises a step computing a score for each of the final poses. The computed score is preferably the number of points in the 3D scene that lie of the surface of the 3D object under the computed pose.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENT

Denotations and Definitions

All of the following data is supposed to be available in electronic form, preferably digital. The methods and algorithms described are considered to be in electronic form and computer implemented.

In the following notation, a 3D point is a point in 3D space that has three coordinate values. Each 3D point refers to a coordinate system, with the most notably coordinate systems being the scene coordinate system where the 3D scene data is defined, and the object coordinate system where the 3D object of interest is defined. A 3D vector is a vector in 3D space that has three coordinate values. A 3D normal vector at a point on a surface is a vector in 3D that has an Euclidian length of 1 and that is perpendicular to the surface at the given point. A 3D point cloud is a set of 3D points. An oriented 3D point cloud is a 3D point cloud where a 3D normal vector is associated with each point. A 3D rigid transformation is a mapping of 3D points to 3D points that preserves the point distances, formally a mapping f such that for any points P, Q the equation $|P-Q|=|f(P)-f(Q)|$ holds. Every 3D rigid transformation can be decomposed into a rotation and a translation, where first the rotation is applied to the argument point, and to that result the translation is applied. Formally, every 3D rigid transformation can be decomposed into a 3D rotation R and a 3D vector T such that $f(P)=R(P)+T$.

Figure 1:
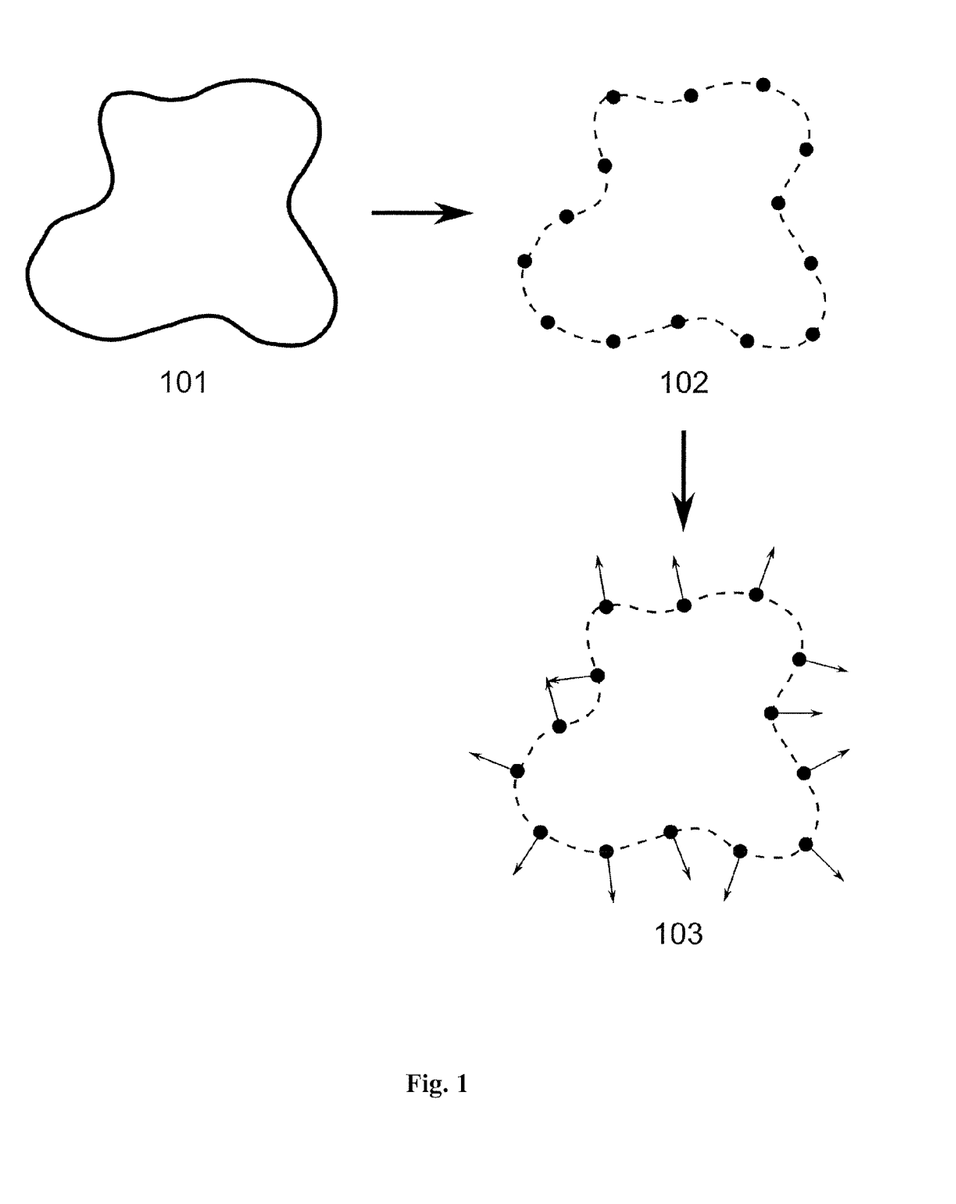
FIG. 1 shows how 3D data is regularized by uniform sampling.

3D data regularization is a method that transforms a surface in 3D into a set of 3D points that are uniformly distributed over said surface, as depicted in FIG. 1. In the preferred embodiment, 3D data regularization is a method that takes as input (a) 3D data that describes a 2D surface in 3D (101), and (b) the sampling distance d; it outputs a set of 3D points (102) that has the properties that (a) it consists only of points that were also on the surface of the input 3D data, (b) all pair of points in the resulting point cloud have a distance of at least d and (c) each point in the input 3D data has a point in the output set that has a distance of at most d. In the preferred embodiment of the invention, the regularized point set with the desired properties is produced for 3D point sets by iterating over the set of input points and adding each of them to the output set only if there is no point in the output cloud yet that is closer to the new point than the sampling distance. 3D CAD models are transformed by sampling each face into a set of points and treating the resulting point set as described before. In an alternative embodiment, the 3D data is regularized by randomly selecting points from the surface. In another alternative embodiment, the normal directions are used for the regularization, where the sub-sampled point set is denser in areas of high curvature. In the preferred embodiment, the surface normals of the points selected from the surface of the 3D data are computed (103).

Regularizing the input point cloud typically leads to a cloud with fewer points that is still a good representation of the original cloud. Regularization is used by our invention in both the offline-phase and the online-phase for efficiently reducing the number of points, leading to faster performance. It is also important for the sampling of the local parameter space, as described below. In the preferred embodiment, the sampling distance d is parameterized in terms relative to the diameter of the object, where the diameter is the maximum distance between two points on the 3D object. Let $D_{obj}$ be the diameter of the object, then the sampling distance d is parameterized by $\tau_d$ as $d=\tau_d D_{obj}$. In an alternative embodiment, the sampling factor is given by the user. In another alternative embodiment, the sampling factor is set according to a-priori information such as the noise level of the 3D data.

The intensity data of a scene or of an object is the appearance of said scene or object from one or more given viewpoints and viewing directions, obtained by measuring the amount of light emitted from the scene or object. Intensity data is typically represented in the form of intensity images. For real scenes or objects, intensity data is typically captured using imaging devices such as cameras. Additionally, intensity data can be created synthetically from 3D data by rendering said 3D data into a virtual view. The possible quality of such a rendered view depends on the type and quality of the provided 3D data. The 3D data can be augmented with additional texture information, which can be used in the rendering process to create a more realistic image of the 3D data. The intensity data can consist of one or more channels of data, where each channel represents a filtered version of the appearance of the scene or object. Typically, multiple channels represent different wavelengths of light and allow, for example, colored versions of the scene or object. Intensity data is typically represented using a 2D grid of pixels. In the following, locations within this 2D grid are also called points in the intensity data, locations within the image, or coordinates within the image.

Feature points are points in intensity data. Feature points can be distributed dense or uniformly throughout the intensity data, or can be located at salient locations within the intensity data. Many different types of feature points are known from the literature. Feature points are typically engineered to have a stable, repeatable location in the presence of noise, clutter, occlusion, and other disturbances. In the preferred embodiment, edge points are used as feature points. In the preferred embodiment, the Canny edge extractor (Canny, J., A Computational Approach To Edge Detection, IEEE Transactions on Pattern Analysis and Machine Intelligence, 8(6):679-698, 1986) is used. In alternative embodiments, any other type of feature points can be used.

Feature descriptors are compressed descriptors of intensity data in the region around a feature point. Feature descriptors are typically used to describe a part of the intensity data in a compressed sense by extracting the most expressive information from said part. They are often used to identify similar parts of intensity data in other locations or views, or to identify the same part of space in different intensity images. In the preferred embodiment, the direction of the gradient of the intensity data at the location of the feature point is used as feature descriptor. In an alternative embodiment, the intensity values at the location of the feature point can be used as feature descriptor. In other alternative embodiments, any other kind of feature descriptor can be used. Multiple different feature descriptors can be combined into a single feature descriptor.

The point pair descriptor is a list of values that describe a pair of points where one point is a 3D point and the other point is a feature point. In the preferred embodiment, first the location of the 3D point within the intensity data is obtained. The point pair descriptor then includes the distance between the two points within the image plane of the intensity data, the angle between the edge direction and the difference vector between the two points, the angle between the normal vector of the 3D point and the difference vector, and the angle between the normal vector and the direction towards the projection center of the intensity data, typically the camera center. In another preferred embodiment, additional feature descriptors of the feature point and of the 3D point are included in the point pair descriptor. In an alternative embodiment, local characteristics such as the color of the surface at the two points, the curvature and other geometric characteristics at the two points, as well as local point descriptors mentioned in the background section can be included in the point pair descriptor. In alternative embodiments, other measurements can be used to describe the two points and their relation without departing from the scope of this invention. Adding more information to the point pair descriptor increases its capability for discriminating between different pairs of points, but also increases its complexity and thus the complexity for calculating, storing and otherwise handling the descriptor.

Figure 2:
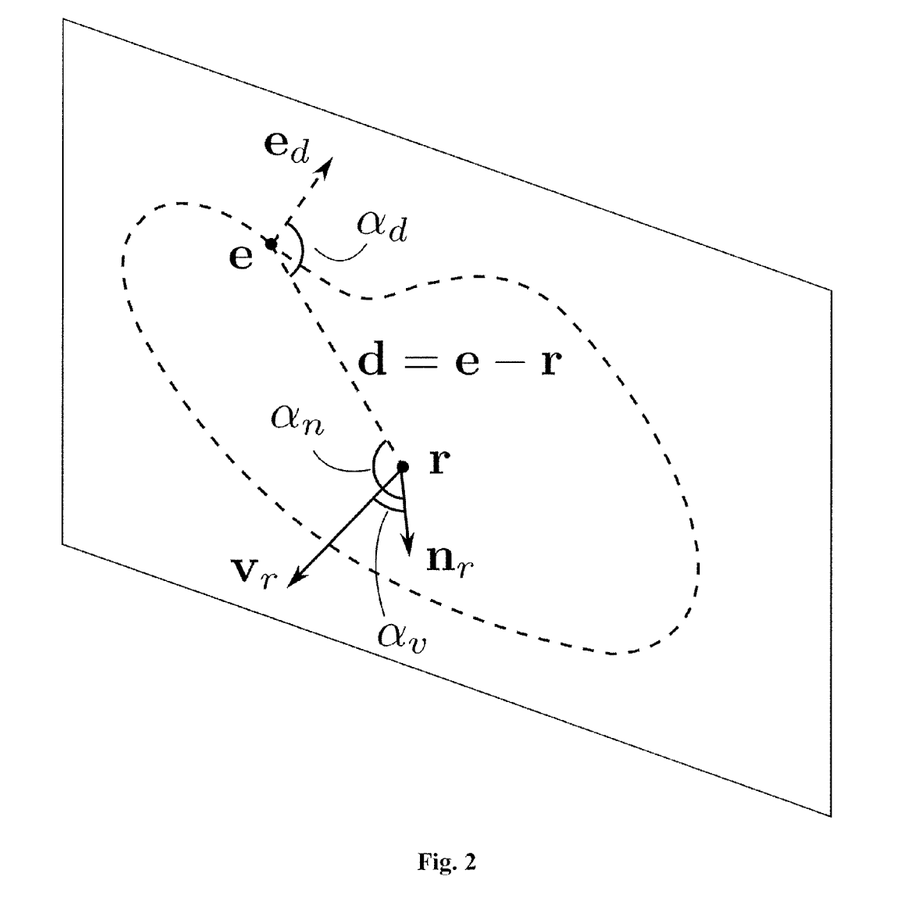
FIG. 2 shows how the relation between a 3D point and an image point can be described.

In the preferred embodiment, the formal definition of the point pair descriptor F of a 3D point P with normal $n_r$, which is located at r within the intensity image and is seen from direction $v_r$ and an edge point e with edge normal $e_1$ is, as depicted in FIG. 2, $$F(P,e,n_r,e_d)=(|r-e|/P_z, \angle(e_d, r-e), \angle(n_r, P_2-P_1), \angle(v_r, n_r)) \quad (1)$$

where $\angle(a, b)$ denotes the angle between two vectors.

The sampled point pair descriptor is a sampled version of the point pair descriptor. In the preferred embodiment, the four entries of a point pair descriptor are sampled in intervals of equal size to produce the sampled point pair descriptor. The formal definition of the sampled point pair descriptor is as follows: let $n_a$ be the number of intervals for angle values and $d_a=360°/n_a$. Let d be a distance sampling factor as described above and let $\lfloor x \rfloor$ be the largest integer value smaller than x, then the sampled version $F_S(P, e, n_r, e_d)$ of a point pair feature $F(P, e, n_r, e_d)=(F_1, F_2, F_3, F_4)$ is defined as $$F_S(P,e,n_r,e_d)=(\lfloor F_1/d \rfloor, \lfloor F_2/d_a \rfloor, \lfloor F_3/d_a \rfloor, \lfloor F_4/d_a \rfloor) \quad (2)$$

The global model description is a data structure that allows efficiently searching for all point pairs on the object that are similar to a given point pair from the scene. It is thus a data structure or method that takes a point pair from the scene as input and that outputs a list of point pairs on the object that are similar to the input point pair. In the preferred embodiment, a mapping from sampled point pair descriptors to sets of point pairs is used as point pair descriptors. The lookup is done by calculating the sampled point pair descriptor for the given point pair, and using the hash map to retrieve all point pairs that have an equal sampled point pair descriptor. The hash table allows efficient access to similar point pairs where the timing is independent from the number of point pairs stored in the model description. In an alternative embodiment, a method for nearest neighbor access can be used to retrieve all point pairs with a point pair descriptor similar to the one of the given point pair. In another alternative embodiment, an arbitrary indexing scheme can be used as data structure, for example search trees.

Figure 3:
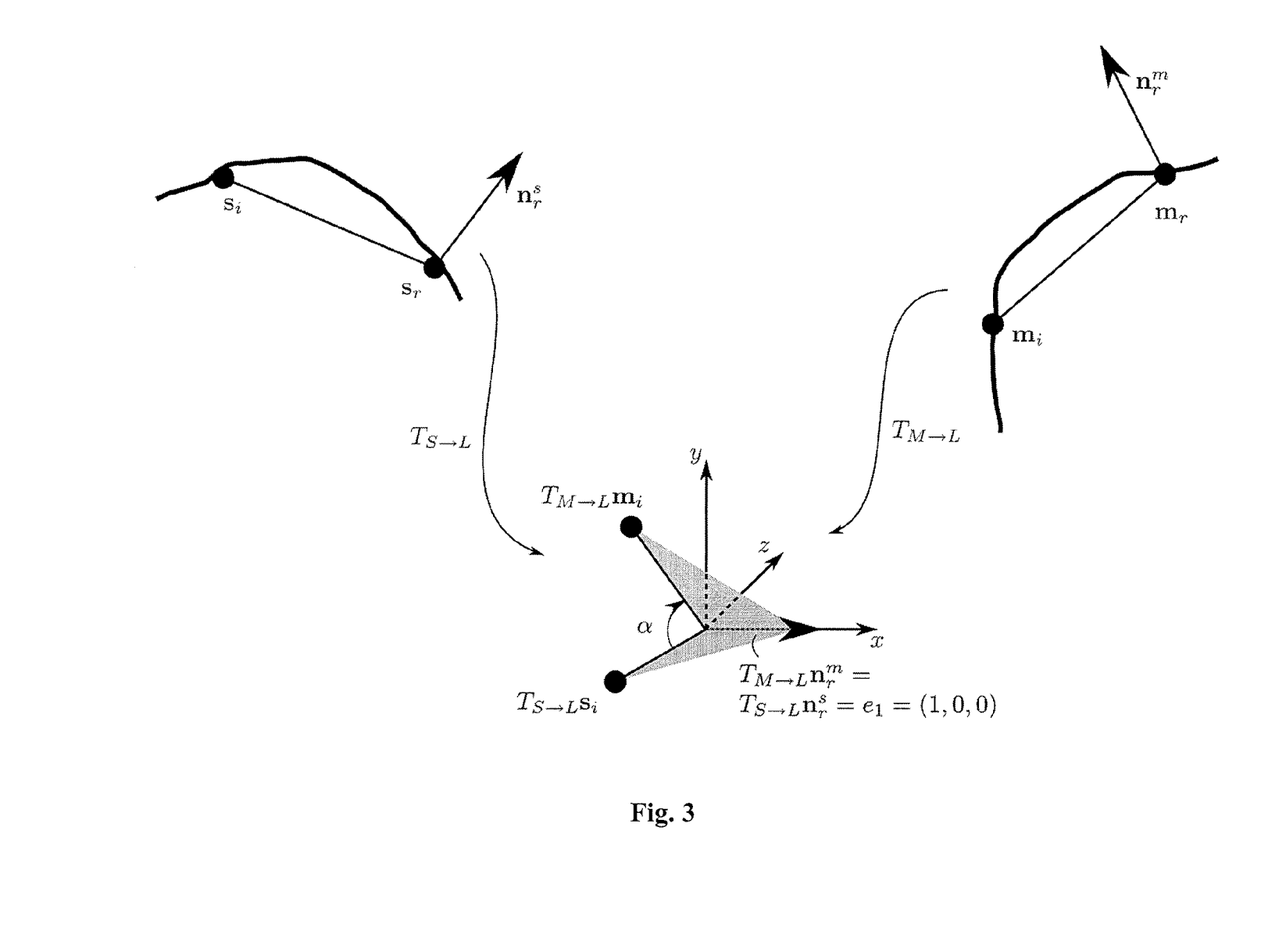
FIG. 3 shows the transformation between the object coordinate system, the local coordinate system and the scene coordinate system using local coordinates.

The local pose of the object in the scene is defined as the 3D pose of an object in a scene relative to a given 3D scene point, called the reference point, under the assumption that the given reference point lies on the surface of the object. The assumption restricts the possible poses. Thus the local pose has less degrees of freedom than a full 3D pose. In the preferred embodiment, the local pose is parameterized using local coordinates as follows: Let $s_r$ be the reference point in the scene that is assumed to lie on the object surface, then (a) $m_r$ is a point on the model surface that corresponds to $s_r$ and (b) $\alpha$ is the angle of rotation around the normal of $s_r$ after aligning $s_r$, $m_r$, and their normals (FIG. 3). The local coordinates with respect to $s_r$ are written as $(m_r, \alpha)$ and have a total of three degrees of freedom, two for the position of $m_r$ on the surface of the model, and one for the rotation angle $\alpha$. In an alternative embodiment, a different parameterization of the object's surface can be used, such as u-v-coordinates or texture coordinates.

For a reference point $s_r$ of the scene, let $T_{S \to L}$ be a rigid 3D transformation that translates $s_r$ into the origin and rotates the normal of $s_r$ onto the x-axis, pointing into positive direction. For a model point $m_r$, let $T_{M \to L}$ be a rigid transformation that translates $m_r$ into the origin and rotates the normal of $m_r$ onto the x-axis, pointing into positive direction. Let $R_s(\alpha)$ be the rigid 3D transformation that rotates around the x-axis with angle $\alpha$. Then, the mapping from of a point $m_i$ in model space to its corresponding point $s_i$ in scene space, given the local coordinates $(m_r, \alpha)$ with respect to the reference point $s_r$, can be written as $$s_i = T_{S \to L}^{-1} R_x(\alpha) T_{M \to L} m_i \quad (3)$$

If $s_i$, $m_i$, $T_{S \to L}$ and $T_{M \to L}$ are known, then the above equation can be solved for $\alpha$.

3D Model Creation

In the offline-phase of the method, a model is built that describes the object of interest in a way suitable for later recognizing it in a scene. The method for creating the model comprises the following steps: (a) Optional preparation of the 3D object data; (b) selection of object sample points; (c) creation of the global model description; (d) optionally, preparation for pose refinement. In the preferred embodiment, the created model will comprise the selected sample points and the global model description. In an alternative embodiment, the following information can be included: the original 3D object data; the data computed for pose refinement; additional information required by the user of the method.

The preparation of the 3D object data serves the purpose of removing unwanted and adding wanted characteristics. In the preferred embodiment, the following steps are included: (a1) an optional suppression of unwanted characteristics from the data, such as noise and outliers produced by the 3D sensor, where the exact method used depends also on the sensor used for acquiring the data; (a2) computation of the surface normals, which is optional if surface normals are already available. The preparation of the object intensity data serves the purpose of removing unwanted and adding wanted characteristics. In the preferred embodiment, the object intensity data is smoothed using a gaussian filter.

In the preferred embodiment, the 3D object data is given either as a set of 3D points, or in form of a computer aided design model (CAD-model). In an alternative embodiment, algebraic surfaces can be used. In another alternative embodiment, any other representation of a 3D surface can be used. In the preferred embodiment, the object intensity data is given in the form of one or more intensity images, each containing one or more channels, obtained using one or more digital cameras. In another preferred embodiment, the object intensity data is created artificially by rendering the given 3D object data in virtual cameras. In other embodiments, other imaging techniques can be used to obtain the object intensity data.

From the 3D object data, a set of object sample points needs to be selected for the creation of the model. In the preferred embodiment, the 3D object data is subsampled using the 3D data regularization method described above to create a sparse set of sample points. In an alternative embodiment, the user might provide a set of points to be used as sample points. In another alternative embodiment, all points from the 3D object data can be used as object sample points. In yet another alternative embodiment, a random subset of points from the object can be used as sample points. In other alternative embodiments, other object sample point selection strategies are possible without departing from the scope of the invention.

From the object intensity data, a set of feature points need to be extracted for the creation of the global model description. In the preferred embodiment, edge points are extracted from the intensity data using a robust edge extractor. In other alternative embodiments, other feature points can be extracted without departing from the scope of the invention.

The method for creating the global model description depends on the specific data structure selected for the global model description. In the preferred embodiment, the creation of the global model description comprises (c1) the computation of the point pair descriptor for each pair of object sample point and object feature point; (c2) the storing of each such pair of points in the global model description by using the computed point pair descriptor as index. In an alternative embodiment, the points can be stored in a data structure such that no point pair descriptor is necessary for efficient lookup of similar point pairs.

If the optional pose refinement shall be used in the matching process and if the selected method for pose refinement requires some sort of data that can be pre-computed from the 3D object, then that data can be computed in the offline-phase as well and be stored with the model. In the preferred embodiment, a data structure that allows a fast search for a point on the object that is closest to a given search point is computed. This data structure is later used for the iterative closest points (ICP) method for pose refinement. In an alternative embodiment, the data structure of any other pose refinement method can be used, for example expectation maximization (EM) (Granger and Pennec (Multi-scale EM-ICP: A fast and robust approach for surface registration, 2002, European Conference on Computer Vision (ECCV 2002), pp. 418-432)).

Object Recognition and Pose Determination

The online-phase of the method recognizes instances of a 3D object in a 3D scene data and scene intensity data and computes the 3D poses of said instances in the scene. It takes as input a 3D scene, scene intensity data, and a 3D model as computed in the offline-phase, and outputs a set of 3D poses of the object in the scene and optionally a set of scores that rank the poses. The online-phase comprises the following steps: (a) Preparation of the 3D scene data, (b) Preparation of the scene intensity data, (c) extraction of scene feature points, (d) selection of reference points, (e) computation of a set of local coordinates for each reference point that, assuming the reference point is on the object of interest, lead to a high consistency of the object and scene, (d) filtering the resulting poses to form a final pose, (e) optional pose refinement, and (f) optional scoring of the final pose.

The preparation of the 3D scene data is a step that serves the purpose of preparing the input 3D data by removing unwanted and adding wanted characteristics. In the preferred embodiment, preparing the input 3D data comprises the following steps: (a1) an optional suppression of unwanted characteristics from the data, such as noise and outliers produced by the 3D sensor, where the exact method used depends also on the sensor used for acquiring the data; (a2) computation of the surface normals, which is optional if surface normals are already available; (a3) uniformly distributing the points in the scene point cloud to avoid bias towards more densely sampled parts of the scene, such as parts more closely to the scanner in case of projection based range scanners. In the preferred embodiment, the sampling distance for step (a3) is set to be equal or larger than the sampling distance used for regularizing the model point cloud in the offline-phase and equal or larger than the sampling distance used for creating the sampled point pair descriptor. Changing the sampling distance leads to a regularized point cloud with a different number of points, which subsequently affects the runtime and accuracy of the disclosed method, and which is thus an important parameter for balancing the two. In an alternative embodiment, the sampling distance can be given by the user. In another alternative embodiment, the sampling distance can be computed from a-priori information such as the noise level of the 3D data. The preparation of the scene intensity data serves the purpose of removing unwanted and adding wanted characteristics.

In the preferred embodiment, the 3D scene data is given either as a set of 3D points, or in form of a computer aided design model (CAD-model). In an alternative embodiment, algebraic surfaces can be used. In another alternative embodiment, any other representation of a 3D surface can be used. In the preferred embodiment, the scene intensity data is given in the form of one or more intensity images, each containing one or more channels, obtained using one or more digital cameras. In another embodiment, the scene intensity data is created artificially by rendering the given 3D scene data in virtual cameras. In other embodiments, other imaging techniques can be used to obtain the scene intensity data.

A number of reference points are selected from the 3D scene data and are used in the subsequent steps. For the method to work, it is important that at least one reference point is selected that lies on the surface of the object of interest, as the subsequent steps find the object pose only if at least one of the reference points fulfills that condition. In the preferred embodiment, the reference points are selected by taking a random subset of points from the scene point cloud, where the number of points in the subset is parameterized relative to the size of the scene point cloud. In an alternative embodiment, all points from the uniformly distributed scene point set or from the original 3D scene data can be used as reference points. In another alternative embodiment, user provided knowledge about the likely position of the object, knowledge about surface characteristics of the model, regularization of the scene point cloud or other methods can be used to steer the selection of the reference points. They can easily be used in the invention without departing from the scope of the invention. The number of selected reference points directly affects the runtime of the disclosed method.

The reference point selection method thus needs to balance between selecting too many reference points, leading to poor performance, and too few reference points, where the chance that the object of interest is missed is increased.

For each reference point selected in the previous step, a set of local coordinates are computed that correspond to the 3D poses that the object of interest has most likely under the assumption that the reference point is on the surface of the object of interest. In the preferred embodiment, a voting scheme similar to the generalized Hough transform is employed that computes the local coordinates that best explain the observed data. In alternative embodiments, several other ways of optimizing the local coordinates are possible, including but not limited to exhaustive search and numerical minimization of energy functions.

In the preferred embodiment, a voting scheme for computing the local coordinates of the object of interest is used that is similar to the generalized Hough transform. It comprises the following steps: (e1) the parameter space, here the space of local coordinates, is partitioned into a set of samples, and a (e2) counter is attached to each sample and is initially set to zero; (e3) a set of scene feature points is selected from the extracted scene feature points: (e4) for each feature point extracted from the scene intensity data, all those local coordinates are determined that lead to an explanation of the feature point by the model, meaning that the current reference point lies on the surface of the object and the current feature point is consistent with the object when transforming the object using those local coordinates; (e5) for each local coordinate that explains the feature point, the counter of the corresponding parameter space sample that contains the local coordinate is increased; (e6) after processing all scene points through steps (e4) and (e5), the counter for each sample of the local coordinate space will correspond to the number of scene points that explain that part of the parameter space. The sample whose counter has the largest value corresponds to those local coordinates that explain the scene points in the best way. In the last step, the sample with the largest counter value, or a set of samples whose counters exceed a threshold are selected. Several alternative embodiments of the voting scheme are possible, including but not limited to: in step (e4), not using all but only a subset of the scene feature points; in step (e5), increasing the counter by a value that depends on the weight of the current feature point; in step (e6), analyzing the voting space for peaks using histogram analysis or other methods.

In the preferred embodiment, the partitioning of the parameter space in step (c1) above is done as follows: The first component of the local coordinates, i.e. the component that describes a position on the model surface, is described by one of the sample points selected from the 3D object data, and is thus implicitly partitioned into discrete values. The second component, i.e. the component that describes the angle of rotation around the normal of the reference point, is partitioned by dividing the interval [0°;360°] of possible rotation angles into $n_a$ intervals of equal size, similar to the sampling of the angle values of the sampled point pair descriptor above. In an alternative embodiment, the partitioning of the first component can be done by expressing it in u-v-coordinates or texture coordinates and sampling those.

The computation of the local coordinates that explain the current scene point in step (c2) is done as follows: (c2.1) the point pair descriptor between the reference point and the current feature point is calculated and sampled as described above; (c2.2) the sampled point pair descriptor is used to access the global model description that was computed in the offline-phase, which will return a list of model point pairs which are similar to the scene point pair; (c2.3) for each such model point pair, the local coordinates that align scene and model point pair are computed using the scene point pair and the model point pair, using equation (3). In an alternative embodiment, the global model description can be based on a nearest neighbor like data structure that allows searching for similar point pairs without sampling the point pair descriptor. In another alternative embodiment, a data structure can be used that allows direct search for similar point pairs without needing a point pair descriptor.

After all scene points, were processed, step (c4) selects samples of the parameter space where the corresponding counter has a maximum. In the preferred embodiment, the counter with the largest value, i.e. the global maximum, is selected. In an alternative embodiment, all samples with a counter value that exceeds a certain threshold can be used, where the threshold can be fixed or can depend on the maximum value of all counters. In another alternative embodiment, a method for detecting local peaks in the counter space instead of a global threshold can be used.

One local coordinate is taken from each selected sample, and the local coordinates are transformed into full 3D poses, each of which is returned with the counter value of the corresponding local coordinate sample. The counter value is the score of said 3D pose.

Pose filtering is a method that takes as input pose candidates, optionally augmented with a score value, from one or more reference points, and that outputs a set of filtered poses that contain only the most likely poses of the object of interest, ordered by the likelihood that the pose is correct. In general, a set of poses may contain zero, one or more poses. Pose filtering serves different purposes:

(1) Outlier removal: The pose candidates for a reference point are computed assuming that the reference point lies on the surface of the object of interest. If that assumption is incorrect, for example in case of clutter points in the scene that do not belong to the object of interest, or if the normal of the reference point is incorrect, then the resulting pose candidates for that reference point will contain incorrect poses that do not correspond to the correct pose of the object. Pose filtering is supposed to remove such incorrect poses.

(2) Increased accuracy and stability: If several reference points are on the surface of the object, then the poses candidates for each of them will contain a pose that corresponds to the correct pose of the object. However, due to numerical errors in the calculation, noise in the data, and due to the sampling steps involved in the above schemes, the poses will differ slightly from the correct pose. Pose filtering groups all correct poses found for the different reference points and computes an average pose, thus increasing the accuracy and stability of the final result.

In the preferred embodiment, pose filtering comprises the following steps: (d1) defining a neighborhood relation between poses, where poses are defined as being neighbors if their rotational part differs less than a fixed threshold, and if the difference of their translation vectors has a length smaller than a fixed threshold; (d2) assigning a new score to each pose that is the sum over all scores of neighboring (as defined in (d1)) poses; (d3) sorting the poses by the new score; (d4) selecting the poses with the best scores; (d5) optionally recomputing the selected poses by averaging over the neighboring poses. In an alternative embodiment, the neighborhood relation of poses in step (d1) is defined by thresholding the maximum difference that a point from the model can have under the two poses, e.g.

$$\max_{v \in M} |P_1 v - P_2 v|.$$

In an alternative embodiment of step (d2), the score is calculated as a weighted sum of the score of neighboring poses, where the weighting function depends on the two poses. In another alternative embodiment of (d1), all poses are considered neighbors and a weighting function is used as described. Additionally, no poses can be considered neighbors in step (d1), effectively leading to the selection of the pose that has the highest single score from the voting scheme. In an alternative embodiment, a clustering method such as k-means or mean shift can be used to select the set of final poses. In the preferred embodiment of step (d5), the translation is averaged by calculating the mean of the translation vectors of the poses, and the rotation is averaged by computing the average Rodriguez vector of the rotations of the poses. In an alternative embodiment of step (d5), the rotations can be composed with the inverse of the rotation of the selected pose prior to calculating the average rotation. This increases the stability of the mean rotation. In another alternative embodiment of step (d5), the average rotation is calculated by optimizing a score function that depends on the poses and the average pose. In alternative embodiments, several other methods are possible for achieving one or more of the above mentioned purposes without departing from the scope of the invention.

Pose refinement describes a class of methods that take as input a set of object data and scene data along with an approximate pose of the model in the scene, and that output a refined, more precise pose of the model. Pose refinement methods typically optimize the correspondence between the scene and the object by minimizing an error function. The drawback of pose refinement is that the initial approximate pose needs to be known and good enough for the method to converge. Our invention as described above computes an approximate pose of the object, which is good enough to be refined using pose refinement. The usage of pose refinement is optional and depends on the accuracy required by the user of the invention. The resulting pose of the presented method is typically accurate enough for object manipulation such as grasping. However, applications that use the invention for surface inspection, for example detecting incorrectly produced parts, might require a pose refinement step. The pose refinement can use the 3D data, the intensity data, or both. In the preferred embodiment, iterative closest points (ICP) is used for pose refinement. For ICP, the sum of distances between 3D points in the scene and the object surface is minimized. In an alternative embodiment, expectation maximization can be used for pose refinement. In another alternative embodiment, any method that minimizes the distances between scene points and object can be used. In other alternative embodiments, several other methods for refining the approximate pose are possible without departing from the scope of the invention.

Scoring is a method that takes as input the final pose as calculated in the algorithm as well as the 3D scene data and the 3D object data, and that outputs one or more values that describe the quality of the calculated pose or the consistency between scene and object under said pose. The quality and accuracy of the final pose depends, among other things, on the presence and visibility of the object of interest in the scene, as well as on the quality of the scene data and the model data. Scoring is required to give the user of the method a way of evaluating the resulting pose, which is a base for subsequent decisions.

Several alternative embodiments for scoring the final pose are possible, including but not limited to: (a) returning the score of the pose as calculated in the voting scheme; (b) returning the accumulative score as calculated in the pose filtering step; (c) counting the number of scene points that lie on the model surface given the resulting pose; (d) computing the covariance of the distances between the scene points and the model surface for scene points that are close to the model under the resulting pose; (e) projecting the model into the image of the range sensor that was used to acquire the scene data, and computing the distances between the model and the scene points in the image domain; (f) the method of (e), but with an additional step of verifying the visibility of the projected model points from more than one view point, as required in the case of stereo methods; (g) computing the sum of the dot products between the normals of the model surface points and the corresponding scene surface points; (h) computing the ratio of the visible model surface and the total model surface, or between the visible model surface and the model surface that is visible in the sensor camera given the resulting pose; (i) computing the similarity between the scene features and the object features; (j) using two or more of the methods from (a) through (i) and combining the resulting values. Additional ways of computing a score are possible, depending on the requirements of the user and on the sensor characteristics, without departing from the scope of the invention.

In the preferred embodiment, if no pose refinement is used, the score calculated in the pose filtering step as calculated in method (b) is returned; if pose refinement is used, the score of method (c), (d), (e) or (f) is returned.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value; respectively. Any reference signs in the claims should not be construed as limiting the scope.

The invention claimed is:

1. A method for recognizing instances of a 3D object in 3D scene data and scene intensity data and for determining the 3D poses of said instances comprising the following steps:
   (a) providing 3D object data and obtaining object intensity data;
   (b) providing 3D scene data and scene intensity data;
   (c) extracting scene feature points from the scene intensity data;
   (d) selecting at least one reference point from the 3D scene data;
   (e) computing, for each selected reference point, pose candidates for the 3D object under the assumption that said reference point is part of the 3D object by maximizing the number of extracted scene feature points that are consistent with the 3D object under the given pose candidate;
   (f) computing a set of filtered poses from the pose candidates;
   wherein step (a) comprises the computation of a model from the 3D object data and object intensity data;
   wherein step (a) further comprises
   (a1) selecting at least one 3D sample point from the 3D object data;
   (a2) extracting 2D object feature points from the object intensity data;
   (a3) computing point pair descriptors that describe, for each pair of selected sample point and extracted object feature point, the two points and their relation;
   (a4) creating a model that stores the point pairs indexed by the point pair descriptor.

2. The method of claim 1, where in step (a) the object intensity data is obtained by synthetically creating intensity data from the 3D object data.

3. The method of claim 1, where in step (a) the object intensity data is provided.

4. The method of claim 1, wherein step (a4) comprises
   (a4a) sampling the point pair descriptors;
   (a4b) creating a global model description that maps each sampled point pair descriptor to a list of point pairs, where each list contains all pairs of selected sample point and extracted object feature point with similar sampled point pair descriptor.

5. The method of claim 1, where in step (d) the reference points are selected randomly from the 3D scene data or by uniformly sampling the 3D scene data.

6. The method of claim 1, where in step (e) a score value is calculated for each pose candidate.

7. The method of claim 6, wherein the pose candidates are computed using a voting scheme.

8. The method of claim 7, wherein the voting scheme comprises the following steps:
   (e1) sampling the space of possible object poses;
   (e2) creating a counter for each pose space sample;
   (e3) selecting at least one scene feature point from the extracted scene feature points;
   (e4) computing, for each selected scene feature point, the matching poses such that the reference point is on the surface of the 3D object and the scene feature point is consistent with the 3D object;
   (e5) increasing, for each matching pose computed in step (e4), the counter for the corresponding pose space sample;
   (e6) detecting peak counter values in the sampled pose space and selecting the corresponding pose space samples as pose candidates.

9. The method of claim 8, where in step (e1) the space of possible object poses is represented by two parameters, where the first parameter is a point on the 3D object, and the second parameter is an angle.

10. The method of claim 9, wherein the point on the 3D object is represented as index into a set of points selected from the 3D object data, and the angle is sampled by dividing the set of angles into intervals of equal size.

11. The method of claim 8, where in step (a) object feature points are extracted from the object intensity data.

12. The method of claim 11, where in step (e4) the matching poses are computed using a data structure that allows to search for pairs of 3D object points and object feature points that are similar to the pair of the reference point and the selected scene feature point.

13. The method of claim 12, wherein the search for similar pairs of points comprises the steps of
  (e4a) computing a point pair descriptor that describes the reference point, the selected scene feature point and their relation;
  (e4b) using said point pair descriptor as index to the data structure.

14. The method of claim 13, wherein step (e4b) comprises
  (e4c) sampling the point pair descriptor;
  (e4d) using a data structure that maps the sampled point pair descriptor to a list of pairs of 3D object points and object feature points.

15. The method of claim 14, where in step (e4d) a hash table is used as data structure.

16. The method of claim 7, wherein the computation of step (f) comprises
  (f1) defining a neighbor relation between the pose candidates;
  (f2) computing the score of each pose as the weighted sum of the scores of the neighboring pose candidates;
  (f3) selecting the set of filtered poses by ranking the poses by the score computed in (f2).

17. The method of claim 16, wherein the neighborhood relation is defined by thresholding the difference in the translation of the poses and the rotation of the poses or by thresholding the maximum distance that a point on the 3D object can have under both poses.

18. The method of claim 16, further comprising a step where the poses selected in (f3) are recomputed as the average pose over the neighboring poses.

19. The method of claim 1, further comprising a step that refines each pose of the set of filtered poses by optimizing an error function that is based on the distances between the 3D scene and the 3D object under said pose.

20. The method of claim 1, further comprising a step that refines each pose of the set of filtered poses by optimizing an error function that is based on the consistency of the scene intensity data and the object intensity data under said pose.

21. The method of claim 1, further comprising a step that refines each pose of the set of filtered poses by optimizing an error function that is based on the distances between the 3D scene and the 3D object and the consistency of the scene intensity data and the object intensity data under said pose.

22. The method of claim 1, where in step (c) edge points are used as scene feature points.

23. The method of claim 22, further comprising a step (c1) where the edge points are further filtered using the 3D scene data.

* * * * *